United States Patent
Trifeletti et al.

(10) Patent No.: US 9,520,705 B2
(45) Date of Patent: Dec. 13, 2016

(54) LIGHTNING PROTECTION FOR SPACED ELECTRICAL BUNDLES

(71) Applicant: The Boeing Company, Chicago, IL (US)

(72) Inventors: Phillip S. Trifeletti, Seattle, WA (US); John Kemp Erdelyan, Lake Stevens, WA (US); Michael C. Dosch, Renton, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 14/136,918

(22) Filed: Dec. 20, 2013

(65) Prior Publication Data

US 2014/0102757 A1    Apr. 17, 2014

Related U.S. Application Data

(63) Continuation-in-part of application No. 13/602,943, filed on Sep. 4, 2012, now Pat. No. 9,112,343.

(51) Int. Cl.
| | |
|---|---|
| *H01B 7/00* | (2006.01) |
| *H01B 7/18* | (2006.01) |
| *H01B 9/02* | (2006.01) |
| *H04B 15/00* | (2006.01) |
| *H05K 9/00* | (2006.01) |
| *H02G 13/00* | (2006.01) |
| *H01R 43/20* | (2006.01) |
| *B64D 45/02* | (2006.01) |

(52) U.S. Cl.
CPC .............. *H02G 13/40* (2013.01); *B64D 45/02* (2013.01); *H01R 43/20* (2013.01); *B64D 2221/00* (2013.01); *Y10T 29/49117* (2015.01)

(58) Field of Classification Search
CPC ..... H01R 43/20; H02G 13/40; B64D 2221/00; B64D 45/02; H01B 9/026; H01B 9/028; H01B 7/30; H01B 7/32
USPC .... 174/102 R, 115; 361/218, 220; 307/3, 91
See application file for complete search history.

(56) References Cited

U.S. PATENT DOCUMENTS

| | | | | |
|---|---|---|---|---|
| 2,070,141 | A * | 2/1937 | Robinson | H01B 7/02 |
| | | | | 174/102 R |
| 3,031,523 | A * | 4/1962 | Howard, Jr. | H01B 7/292 |
| | | | | 174/102 R |
| 3,422,281 | A * | 1/1969 | Coston | H02G 15/103 |
| | | | | 174/105 R |
| 3,459,877 | A * | 8/1969 | Bullock | H01B 7/202 |
| | | | | 138/128 |
| 3,496,281 | A * | 2/1970 | McMahon | H01B 7/0241 |
| | | | | 174/102 R |

(Continued)

OTHER PUBLICATIONS

U.S. Appl. No. 13/848,842, Office Action issued Sep. 5, 2014.
U.S. Appl. No. 13/602,943, Office Action issued Dec. 4, 2014.
Notice of Allowance; U.S. Appl. No. 13/602,943 (Apr. 15, 2015).

*Primary Examiner* — Timothy Thompson
*Assistant Examiner* — Rhadames J Alonzo Miller
(74) *Attorney, Agent, or Firm* — Thompson Hine LLP (57) ABSTRACT

A shielded power feeder system may include at least one unshielded power feeder conductor, and at least one grounded guard wire conductor positioned adjacent to the at least one unshielded power feeder conductor, the at least one unshielded power feeder conductor and the at least one grounded guard wire forming a bundle.

19 Claims, 8 Drawing Sheets

(56) References Cited

U.S. PATENT DOCUMENTS

| | | | | |
|---|---|---|---|---|
| 3,571,613 A * | 3/1971 | Plate | | H01B 9/028 174/107 |
| 3,582,417 A * | 6/1971 | Plate et al. | | B29C 47/027 156/51 |
| 3,666,877 A * | 5/1972 | Arnaudin, Jr. | | H01B 9/026 174/102 SC |
| 3,673,307 A * | 6/1972 | Eager, Jr. | | H01B 7/1855 174/10 |
| 3,728,474 A * | 4/1973 | Arnaudin, Jr. | | H01B 9/026 174/105 SC |
| 4,715,571 A * | 12/1987 | Soltow | | F16L 3/22 174/146 |
| 4,816,611 A * | 3/1989 | Invernizzi | | H02G 13/80 174/102 R |
| 5,131,064 A * | 7/1992 | Arroyo | | G02B 6/4432 174/20 |
| 5,218,167 A * | 6/1993 | Gasque, Jr. | | H01B 11/1091 174/107 |
| 5,243,138 A * | 9/1993 | Guthke | | F16L 3/222 174/138 R |
| 5,418,330 A * | 5/1995 | Rook | | H01R 9/0512 174/75 C |
| 5,631,444 A * | 5/1997 | Rook | | H01R 4/646 174/78 |
| 5,742,982 A * | 4/1998 | Dodd | | F16G 11/00 24/16 R |
| 5,817,982 A * | 10/1998 | Arumugasaamy | | H01B 7/288 174/120 C |
| 5,834,699 A * | 11/1998 | Buck | | H01B 7/041 174/113 R |
| 5,864,094 A * | 1/1999 | Griffin | | H01B 11/12 174/105 R |
| 6,127,625 A * | 10/2000 | Castano | | H02G 7/20 174/40 R |
| 6,191,354 B1 * | 2/2001 | Castano | | H02G 7/20 174/40 R |
| 7,060,905 B1 * | 6/2006 | McMahon | | H01B 11/1891 174/110 R |
| D597,403 S * | 8/2009 | Ho | | D8/356 |
| 8,020,259 B2 * | 9/2011 | Ho | | F16L 3/222 24/129 R |
| 8,020,811 B2 * | 9/2011 | Nelson | | F16L 3/2235 174/68.1 |
| 8,590,847 B2 * | 11/2013 | Guthke | | H02G 3/32 174/68.1 |
| 8,873,214 B2 * | 10/2014 | Catchpole | | H02G 13/00 361/220 |
| 2001/0011601 A1 * | 8/2001 | Renaud | | H01B 7/0045 174/102 R |
| 2004/0200634 A1 * | 10/2004 | Ysbrand | | H01B 11/146 174/102 R |
| 2005/0057320 A1 * | 3/2005 | Brandt | | H02J 13/002 333/24 R |
| 2006/0158035 A1 * | 7/2006 | Brandt | | H02J 13/002 307/3 |
| 2007/0120023 A1 * | 5/2007 | Martinez | | E02F 9/2275 248/75 |
| 2007/0272430 A1 * | 11/2007 | Tuffile | | H01B 11/1008 174/102 R |
| 2008/0007878 A1 * | 1/2008 | Gandolfi | | H01B 9/028 361/42 |
| 2009/0261651 A1 * | 10/2009 | Godecke | | H04B 3/54 307/3 |
| 2010/0046128 A1 * | 2/2010 | Wang | | H01H 83/14 361/42 |
| 2010/0097023 A1 * | 4/2010 | Nakamura | | H01B 9/026 318/400.41 |
| 2010/0307811 A1 * | 12/2010 | Griffin | | H01B 11/12 174/350 |
| 2012/0000690 A1 * | 1/2012 | Van Der Meer | | H01B 7/2825 174/102 R |
| 2012/0043108 A1 * | 2/2012 | Blumer | | H01B 7/043 174/107 |
| 2012/0075756 A1 * | 3/2012 | Yu | | H02H 3/33 361/42 |
| 2013/0187012 A1 * | 7/2013 | Blakeley | | H02G 3/32 248/68.1 |
| 2013/0258541 A1 * | 10/2013 | Knobloch | | H01B 7/2813 361/111 |

* cited by examiner

LIGHTNING PROTECTION FOR SPACED ELECTRICAL BUNDLES

BACKGROUND

The present invention relates to electrical conductors and, more particularly, to electrical conductors for transmitting electrical power that are shielded from electromagnetic effects.

Electrical systems aboard aircraft are susceptible to electromagnetic effects (EME). As used herein, EME includes electromagnetic interference (EMI), such as transient voltage and current spikes caused by lightning, as well as electromagnetic compatibility (EMC) issues. Such electrical systems often include long runs of conductors that convey electric current from a source, such as a battery, generator or circuit panel, to a load, such as a motor, a light or other electrical component. For example, a lightning strike may cause electric voltage or current to be induced in the conductors, where it travels to and may damage electrical components.

The effect of a lightning strike may be mitigated somewhat in an aircraft made of a conductive material such as aluminum. A lightning strike may be conducted along the skin of an aircraft made of aluminum and not induce significant electric current in the conductors of on-board electrical systems. However, with the introduction of aircraft made partly or entirely of composite materials, such as carbon fiber composites, the ability of the skin of an aircraft to conduct electricity and therefore act as a shield for internal electrical conductors from external EMI such as lightning strikes, is reduced or eliminated, which may require greater shielding of electrical conductors.

Typically, an electrical conductor, such as that found in a power feeder system, may provide three-phase power. The three-phase power may be created by a generator on board the aircraft and transmitted by cables to a bus or load, such as a three-phase motor. The feeder system in such an application may include three discrete, insulated cables wrapped around a neutral cable, forming a bundle. The bundle of four cables may be enclosed in a sheath of braided metallic material (commonly referred to as a shield) that is grounded at its ends. The braided metallic material may be covered by a sheath of insulating material, and may be separated from the bundle of conductors and neutral cable by a layer of insulated material.

The metallic sheath that covers the entire bundle of conductors and the neutral cable may add to the non-payload weight of the aircraft, which is undesirable. Moreover, by enveloping the entire cable bundle in a grounded, metallic sheath, which in turn may be covered by an insulative sheath, there is a risk of unacceptable heat build-up within the sheath. Accordingly, there is a need for a power feeder system that provides adequate protection from transient voltage spikes resulting from EME, such as lightning strikes to an aircraft, and which minimizes heat build-up and weight.

SUMMARY

In one aspect, a shielded power feeder system may include at least one unshielded power feeder conductor; and at least one grounded guard wire conductor positioned adjacent the at least one unshielded power feeder conductor, the at least one power feeder conductor and the at least one grounded guard wire forming a bundle.

In another aspect, an aircraft may include a shielded power feeder system, the system including a plurality of unshielded power feeder conductors; and a plurality of grounded guard wire conductors positioned adjacent each of the plurality of unshielded power feeder conductors, the plurality of power feeder conductors and the plurality of grounded guard wires forming a bundle.

In yet another aspect, a method for forming a shielded power feeder conductor may include positioning a plurality of unshielded power feeder conductors in a spaced-apart relation; positioning a plurality of grounded guard wire conductors in a spaced-apart relation; positioning ones of the plurality of grounded guard wire conductors adjacent each of the plurality of unshielded power feeder conductors in a spaced-apart relation; and forming a bundle of the plurality of power feeder conductors and the plurality of grounded guard wire conductors by fixing the spacing between the plurality of power feeder conductors and the plurality of grounded guard wire conductors.

Other aspects and advantages of the present disclosure will be apparent from the following description, the accompanying drawings and the appended claims.

DETAILED DESCRIPTION

Figure 1:
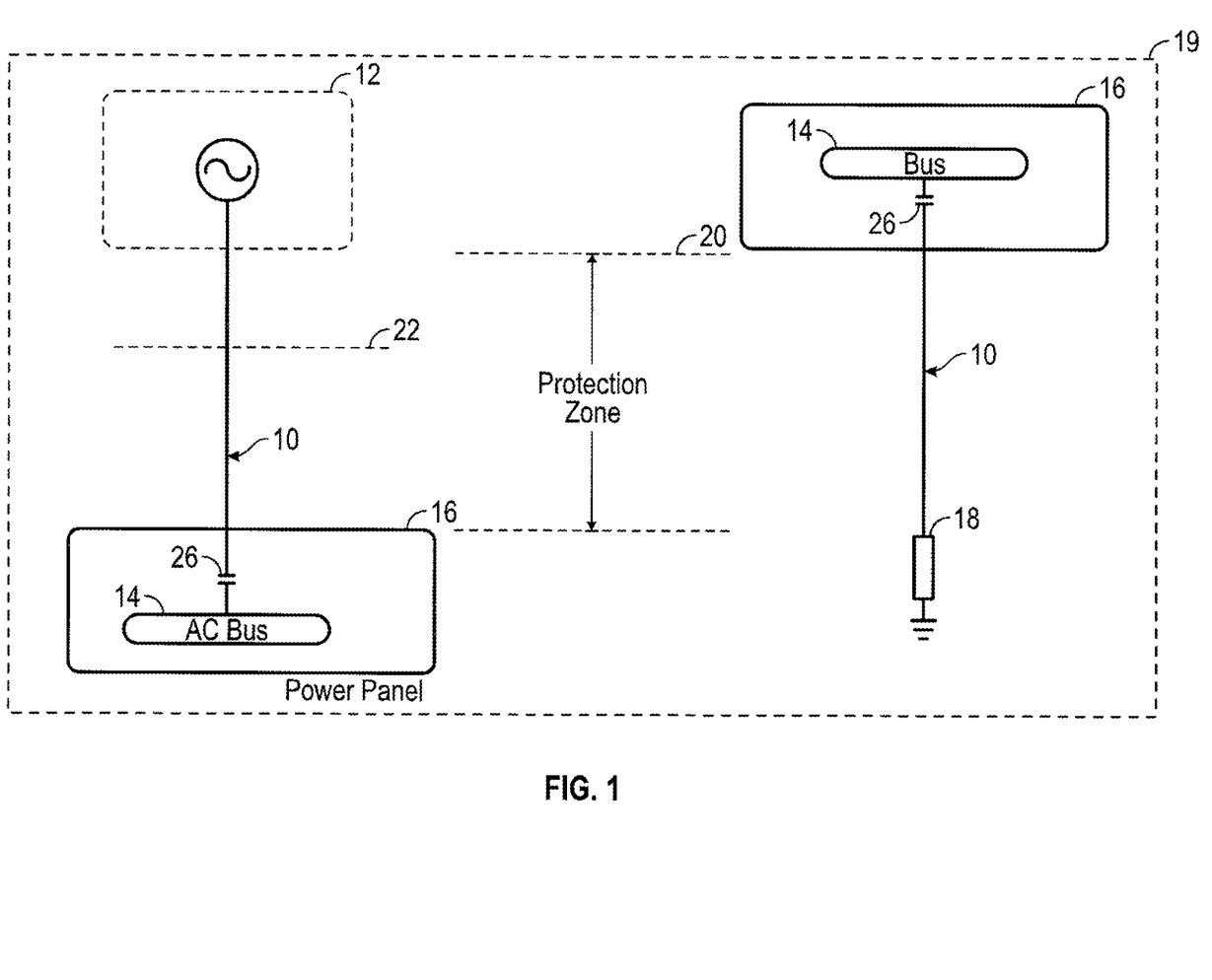
FIG. 1 is a schematic showing the disclosed shielded power feeder system used to convey power from a generator to a power panel, and from a power panel to a load.

As shown in FIG. 1, the shielded power feeder system, generally designated 10, may be employed to extend between a generator 12 and an electrical bus 14, which may consist of one or more electrical components or loads, as shown in the left-hand portion of FIG. 1. In an embodiment, the shielded power feeder system 10 also may be employed to extend between a power panel 16 and a load 18, as shown in the right-hand portion of FIG. 1. In an embodiment, the electrical bus 14 may be the source, while the load 18 may be a variable frequency starter generator (such as the generator 12). In other embodiments, the load 14 may be a single-phase or polyphase motor, or other electrical component. Either or both of the circuits shown in FIG. 1 may be located within a vehicle 19, which in embodiments may be a piloted or unpiloted aircraft, a piloted or unpiloted spacecraft, a marine craft, or a piloted or unpiloted land vehicle. The shielded power feeder system 10 may extend through a protection zone 20 that may include a production break 22 (e.g., where an aircraft wing is attached to a fuselage). The power feeder system 10 may be connected to the bus 14 of power panel 12. The power panel 12 also may include a circuit breaker 26.

Figure 2:
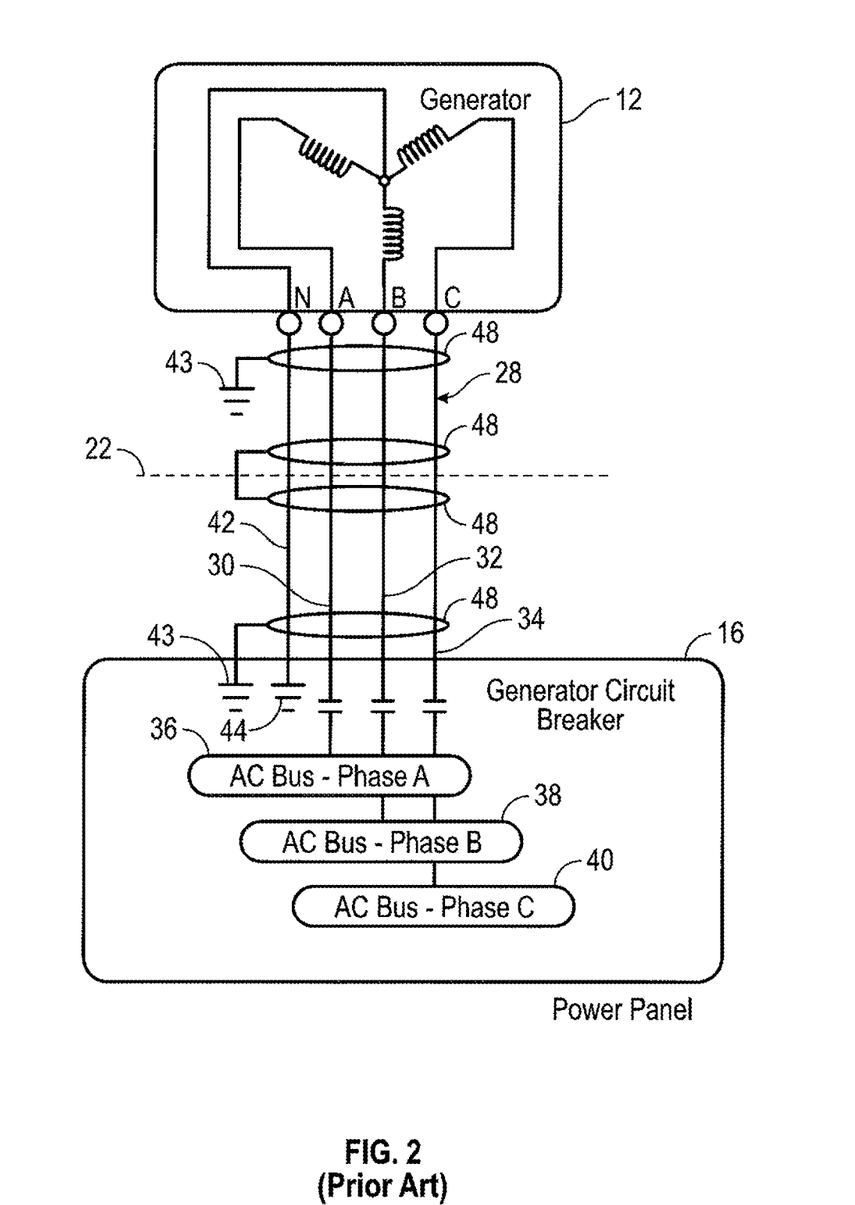
FIG. 2 is a schematic showing a prior art shielded power feeder system.
Figure 4A:
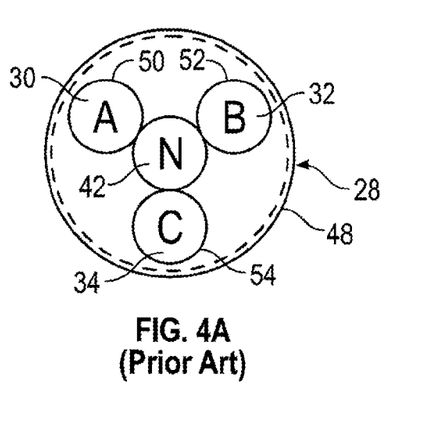
FIGS. 4A and 4B are schematics showing cross-sections of prior art power feeder cables.

As shown in FIG. 2, in a prior art shielded power feeder system, generally designated 28, the system may include power feeder conductors 30, 32, and 34. Conductors 30, 32, 34 are connected, respectively, to alternating current buses 36, 38, 40 within a power panel 16. Cables 30, 32, 34 may be connected to contacts A, B and C of a three-phase generator 16. Neutral conductor 42 may be connected to the neutral contact N and grounded at 44. As shown in FIG. 4A, the conductors 30, 32, 34 may be spaced about the neutral 42. The conductors 30, 32, 34, and neutral 42 together form a bundle that is shielded by a sheath 48 that encloses the entire bundle; that is, the sheath 48 encloses conductors 30, 32, 34, and neutral 42. Further, conductors 30, 32, 34 themselves may have insulative coverings or sheaths 54. The sheath 48 may include a first layer of an insulative material such as plastic or rubber, a second layer of a conductive material, grounded at its ends 43, such as a woven sheath of metal such as copper or nickel-plated copper, and an outer layer of an insulative material, such as a plastic or rubber.

Figure 4B:
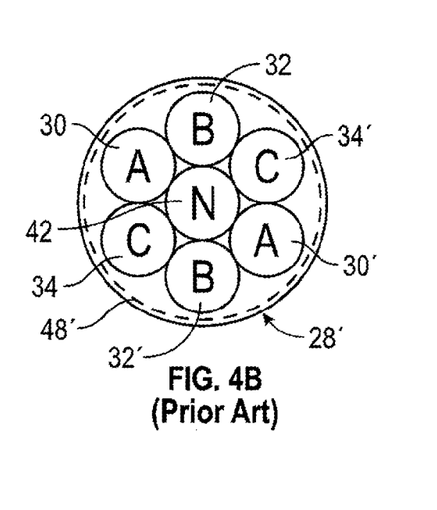

As shown in FIG. 4B, in another prior art power feeder system 28', a neutral cable 42 is surrounded by 6 conductors 30, 30', 32, 32', 34, 34'. As with the embodiment of FIG. 4A, the embodiment of FIG. 4B provides a neutral cable 42 that is surrounded by conductors 30-34', typically wrapped around the neutral in a spiral pattern. The entire arrangement forms a bundle that is enclosed within a sheath 48' having the same layered construction as the sheath 48 of FIG. 4A; namely, an inner layer of insulated material, a layer of conductive material surrounding it, and an outer layer of insulated material.

A disadvantage with this construction is that the shielded power feeder system 28, 28' requires a great deal of metal to form the sheath 48, 48', which adds non-payload weight to the aircraft 18 (FIG. 1). Further, by enclosing the entire bundle in sheath 48, 48', the enclosure may allow undesirable heat build-up in the power feeder system within the sheath 48, 48'.

Figure 3:
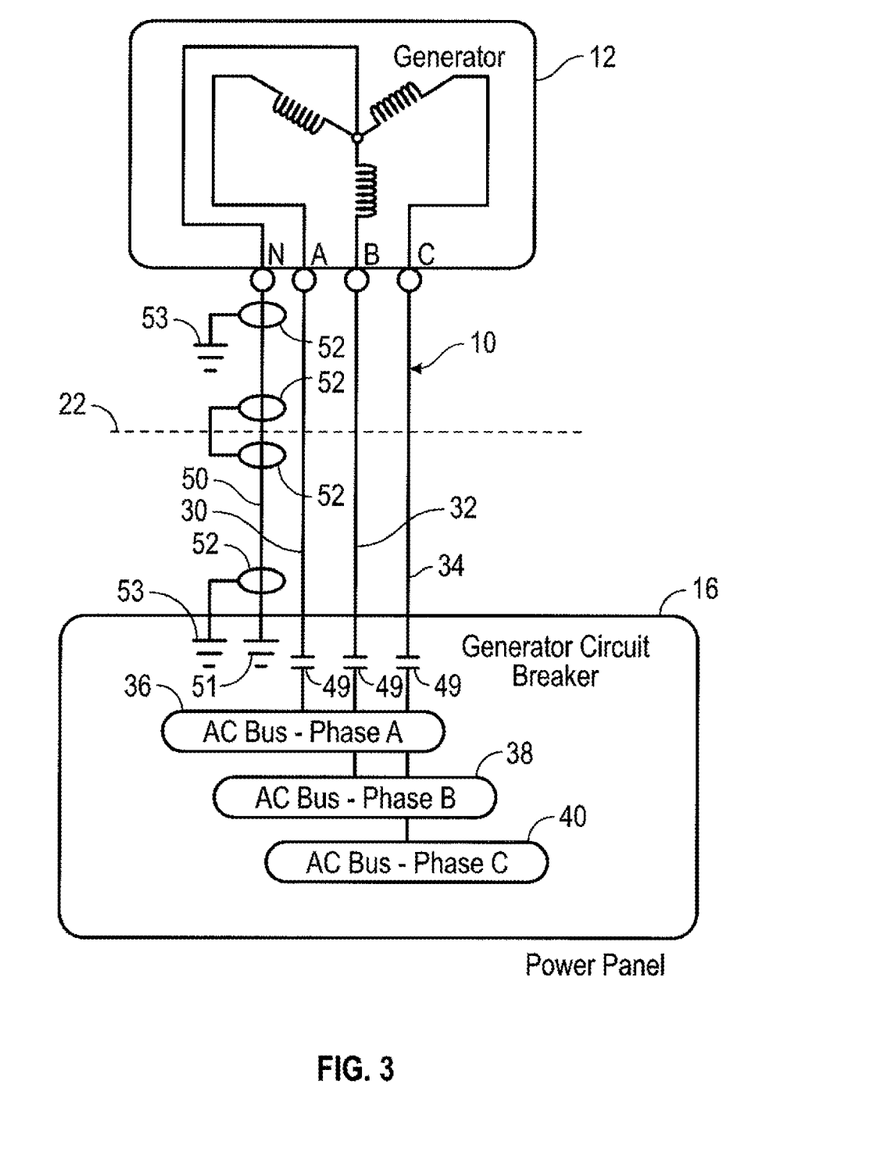
FIG. 3 is a schematic showing an embodiment of the disclosed shielded power feeder system.
Figure 6A:
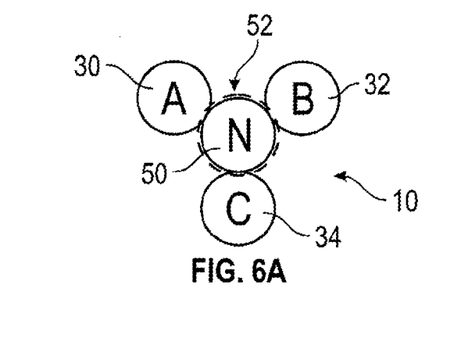
FIGS. 6A and 6B are cross-sections of embodiments of the disclosed shielded power feeder system.

As shown in FIGS. 3 and 6A, the disclosed shielded power feeder system 10 may be used in a three-phase power feeder system. In other embodiments, the power feeder system may be used in other polyphase systems (not shown) having two phases, or more than three phases, or may be used in a single-phase system (not shown). In the system 10 shown in FIG. 3, power feeder conductors 30, 32, 34 may be connected to alternating current buses 36, 38, 40 of the power panel 16, and extend to contacts A, B, and C (corresponding to the three phases of the generator) of the load, which may be a generator 12, such as a variable frequency starter generator. The conductors 30, 32, 34 each may be connected to a circuit breaker 49 of the power panel 16.

In an embodiment, the power feeder conductors 30, 32, 34 may be cables and may be unshielded; that is, they do not include coverings that include a conductive layer or shield from EME. As used herein, the term "unshielded" means, with respect to a conductor, that the conductor is not covered with a conductive layer separated by an insulating layer. An unshielded conductor may be covered by a layer or layers of insulating material and still be unshielded if it does not also have a layer of conductive material covering it.

Figure 5:
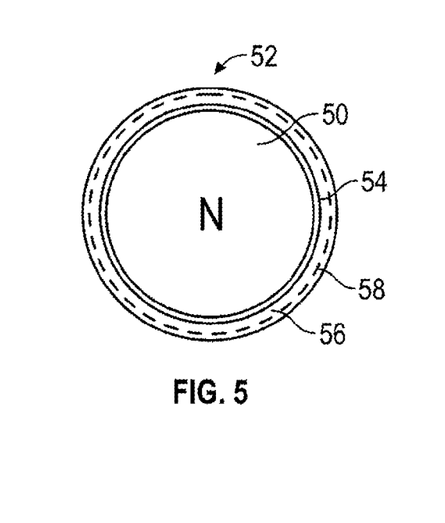
FIG. 5 is a cross-section of a neutral conductor of the disclosed shielded power feeder system.

The system 10 also may include a neutral conductor 50 that is connected to the power panel 16 and contact N of the generator 12, and is grounded at 51. As shown in FIGS. 3 and 5, the neutral conductor 50 is enclosed in a conductive shield, generally designated 52, that is grounded at its ends at 53. In other embodiments, the conductive shield 52 may be grounded at one or more additional locations between its ends. In an embodiment, the conductive shield 52 may be layered directly on the outer surface of the neutral conductor 50. In various embodiments, the conductive shield 52 may extend the entire length of the neutral conductor 50, may extend along only length in the protection zone 20 (FIG. 1), or a portion or portions of the neutral conductor.

As shown in FIG. 5, the conductive shield 52 that encloses neutral conductor 50 may include an insulation layer 54 that is immediately adjacent the neutral conductor 50, and in an embodiment is bonded directly to the neutral conductor. The insulation layer 54 may be composed of plastic or rubber. A conductive layer 56 is immediately adjacent and encloses the insulation layer 54. Conductive layer 56 may be made of a metallic material and may be braided. Metallic materials may include copper and nickel-plated copper. In other embodiments, the conductive layer 56 may be made of a conductive foil or a combination of braided metallic material and conductive foil material. In an embodiment, the conductive shield 52 may include an outer layer or jacket 58 of an insulative material, such as plastic or rubber covering the conductive layer 56.

As shown in FIG. 6A, the power feeder conductors 30, 32, 34 and neutral conductor 50 of the power feeder system 10 may be arranged in a bundle in which the neutral conductor may be positioned at the center of the bundle, surrounded by the unshielded power feeder conductors. As is apparent from FIG. 6A, the only shielding from EME present in the bundle may be the grounded conductive shield 52 that encloses the neutral conductor 50. In an embodiment, the conductors 30, 32, 34 may be spaced evenly about the neutral conductor 50 and, in an embodiment, the conductors 30, 32, 34 extend in a spiral configuration (commonly referred to as twisted) as they extend lengthwise between the power panel 16 and load 14 or generator 16 (FIG. 1).

Figure 6B:
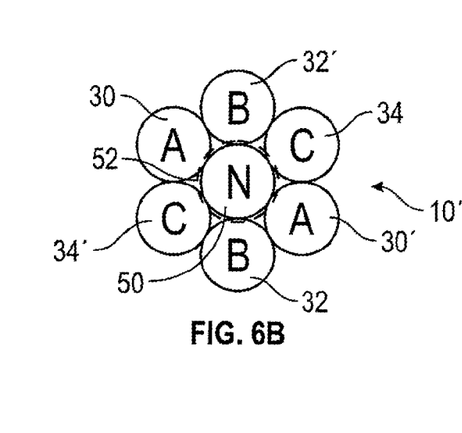

As shown in FIG. 6B, a power feeder system 10' may include a bundle composed of six unshielded power feeder conductors 30, 32, 34, 30', 32', 34', spaced evenly about the shielded neutral conductor 50. Again, the shielding 52 may be the only shielding that is required or present in the bundle of feeder system 10'.

Figure 7A:
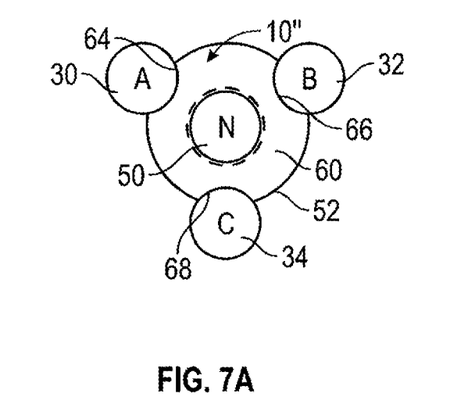
FIGS. 7A and 7B are embodiments of the disclosed shielded power feeder system, shown with spacers between the conductor cables and the neutral cable.
Figure 7B:
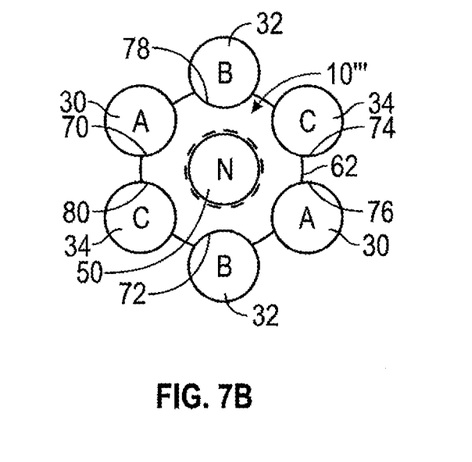

As shown in FIGS. 7A and 7B, embodiments 10" and 10'" of the disclosed shielded power feeder system may include spacers 60, 62. The spacer 60 of FIG. 7A may surround neutral conductor 50 and grounded conductive shield 52. The spacer 60 may include recesses 64, 66, 68 shaped to receive unshielded conductors 30, 32, 34.

Similarly, in FIG. 7B, spacer 62 may include recesses 70, 72, 74, 76, 78, 80 shaped to receive unshielded conductors 30, 32, 34, 30', 32', 34', respectively. Spacers 60, 62 may maintain the unshielded conductors 30, 32, 34, 30', 32', 34' in an evenly spaced relationship as shown in FIGS. 7A and 7B. As indicated in FIG. 1, a plurality of spacers 60, 62 may be spaced along the power feeder system 10 in the protection zone 20. Spacers 60, 62 may be oriented relative to each other to maintain a helical path of the conductors 30, 32, 34, 30', 32', 34' around neutral cable 50 as they extend from the power panel 16 to the load 14 or generator 12.

As best understood, in the event of EME, such as a lightning strike or other electromagnetic pulse, impacting the vehicle 18 (FIG. 1), the current from the EMI would be carried by the conductive layer 56 (FIG. 5) of the neutral conductor 50 to ground 44. The flow of current from the EMI source through the conductive layer 56 may establish a magnetic field in the center of the bundle shown in FIGS. 6A, 6B, 7A, and 7B, which in turn opposes and cancels EMI-induced currents on the feeder conductors 30, 32, 34, 30', 32', 34'. An advantage of the embodiments 10, 10' 10", and 10''', is that the design provides protection of power feeders and other conductors aboard a vehicle such as an aircraft 19 from damage from lightning-induced voltage and current, as well as other EME, by employing a small shield 52 that surrounds only the neutral conductor 42. The neutral shield 52 conducts the lightning current or other EME current safely to ground, and establishes a magnetic field in the center of the bundle that opposes any induced voltage or currents on the other feeder conductors. Because the shield 52 surrounds only the neutral conductor 50, as opposed to surrounding the entire bundle of conductors, as shown in the prior art depicted in FIGS. 2, 4A and 4B, the system 10, 10', 10" and 10''' design may provide a significant reduction in the overall weight of the power feeder system.

Figure 8:
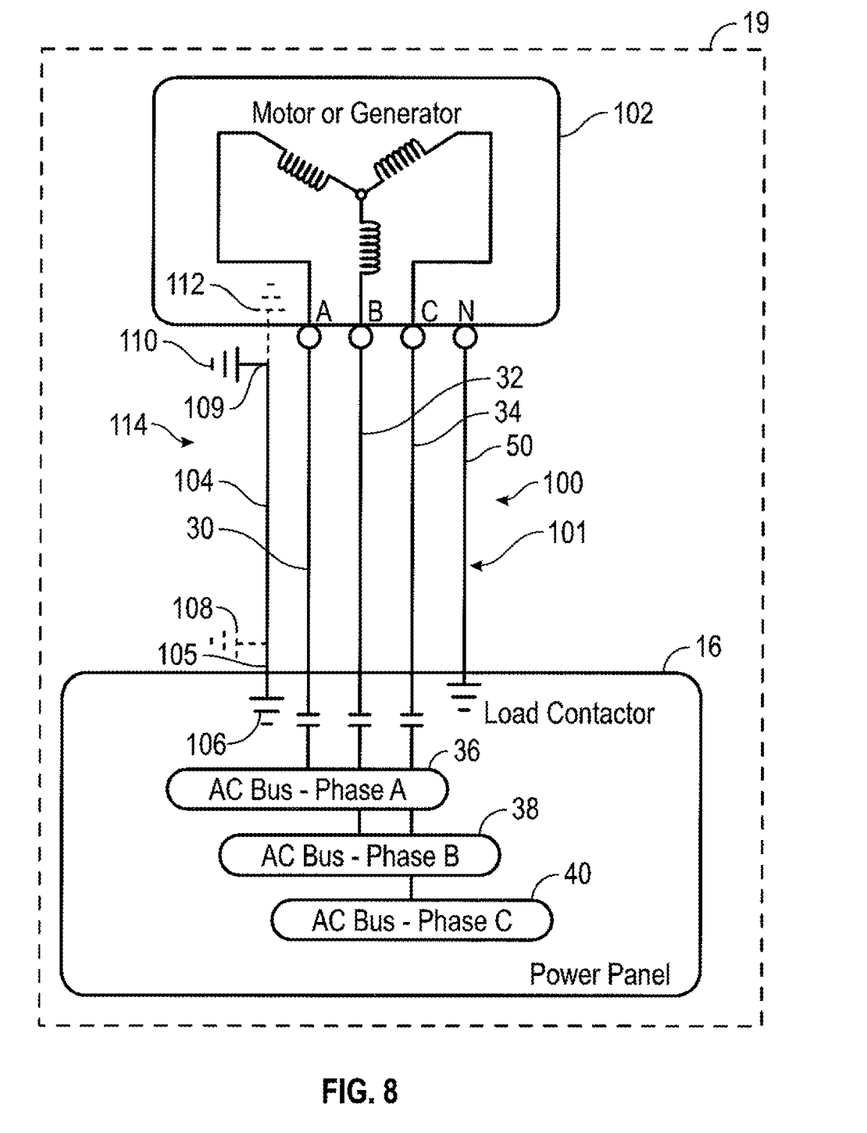
FIG. 8 is a schematic of another embodiment of the shielded power feeder system.

As shown in FIG. 8, an embodiment of the shielded power feeder system, generally designated 100, may be used in connection with unshielded power feeder conductors 30, 32, 34, and neutral wire 50, all of which may extend between alternating current buses 36, 38, 40, respectively, of a power panel 16 and an electrical component 102 that in an embodiment may take the form of a three-phase motor. In other embodiments, the component 102 may take the form of a generator. The system 100 may include a grounded guard wire 104 that extends adjacent the unshielded power feeder conductors 30, 32, 34 and is electrically isolated from them. In an embodiment, the unshielded power feeder conductors 30, 32, 34 may be covered with an outer insulation layer that electrically isolates the power feeder conductors from the grounded wire 104. Alternately, or in addition, the grounded wire 104 may be covered with an outer insulation layer that electrically isolates the grounded wire from the power feeder conductors 30, 32, 34.

A first end 105 of the grounded wire 104 may be attached and grounded at 106 to the power panel 16. Alternately, the first end 105 of the grounded wire 104 may be grounded at 108 to a current return network, or to a metal structure such as the mounting structure of the power panel 16 of the vehicle 19. Similarly, a second end 109 of the grounded wire 104 may be connected at 110 to a current return network, or to a metal structure, such as a strut, of the vehicle 19. Alternately, the second end 109 of the grounded wire 104 may be connected at 112 and grounded to a housing of the electrical component 102.

With each of the embodiments, the grounded wire 104 may extend through a lightning threat zone, generally designated 114, of the vehicle 19. It may be preferable to ground the grounded wire 104 as close to the ends of the unshielded power feeder conductors 30, 32, 34 as practicable. Thus, in the embodiment of FIG. 8, the shielded power feeder system 100 may take the form of at least one unshielded power feeder conductor 30, 32, or 34, and at least one grounded guard wire 104 conductor positioned adjacent the at least one unshielded power feeder conductor, the at least one power feeder conductor and the at least one grounded guard wire forming a bundle 101.

Figure 9:
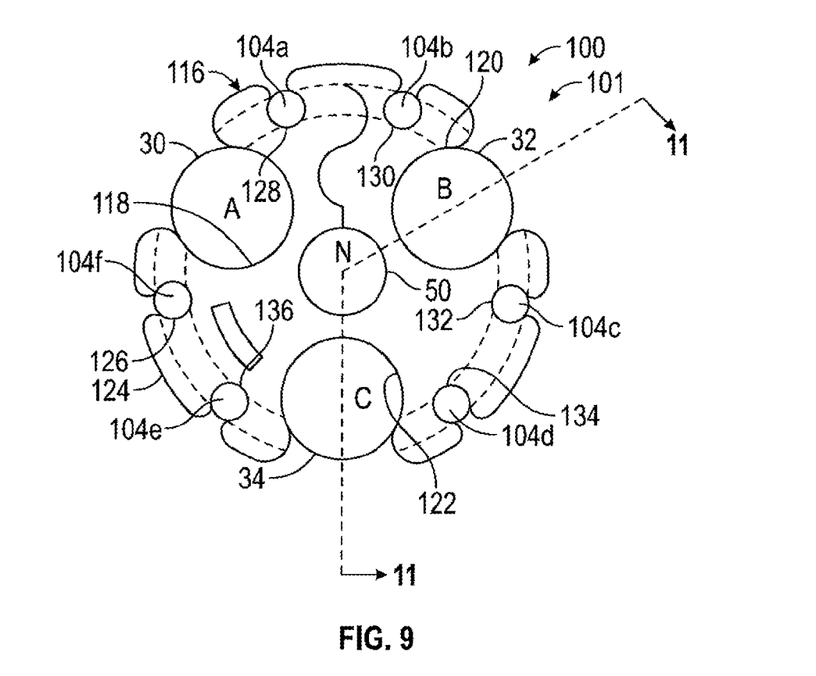
FIG. 9 is a detail of the embodiment of FIG. 8, showing placement of guard wires and power feeder conductors.

As shown in FIG. 9, in an embodiment, the at least one grounded guard wire conductor 104 may take the form of a plurality of grounded guard wire conductors, such as six guard wire conductors 104a, 104b, 104c, 104d, 104e, 104f. The guard wire conductors 104a-104f may be sheathed in a dielectric or insulation layer of a suitable plastic. In an embodiment, the plurality of grounded guard wire conductors 104a-104f may include grounded guard wire conductors spaced about the bundle 101. In an embodiment, the grounded guard wire conductors 104a-104f may be spaced about the periphery of the bundle 101. In an embodiment, the grounded guard wire conductors 104a-104f may be positioned on either side of the at least one of the unshielded power feeder conductors 30, 32, 34. In an embodiment, the unshielded power feeder conductors 104a-104f may be positioned on either side of each of the three unshielded power feeder conductors 30, 32, 34. In one embodiment, each of the grounded guard wire conductors 104a-104f may be 8 AWG guard wires, and may have an outer diameter of 0.194+/−0.009 inches.

Figure 10:
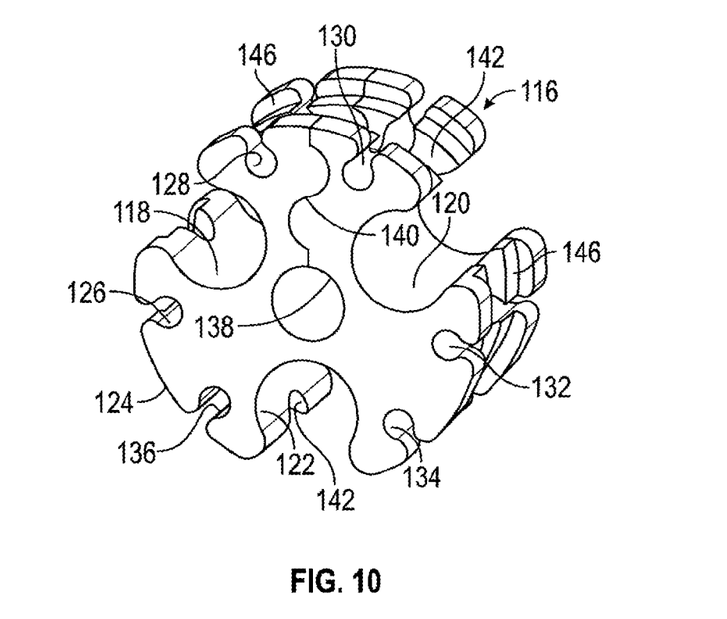
FIG. 10 is a perspective view of a spacer used with the embodiment of FIG. 8.
Figure 11:
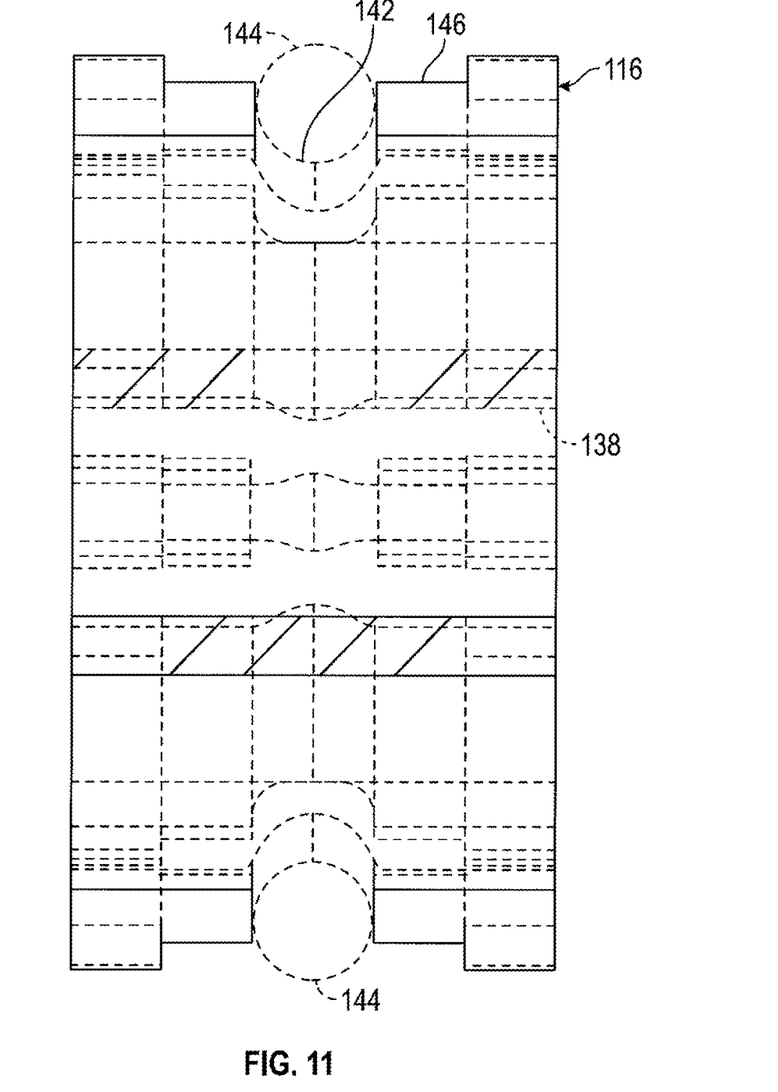
FIG. 11 is a sectional view of the spacer of FIGS. 9 and 10, taken a line 11-11 of FIG. 9.

As shown in FIGS. 9, 10, and 11, shielded power feeder conductor system 100 may include at least one spacer 116 shaped to receive and hold the three power feeder conductors 30, 32, 34 in a fixed, spaced relation to each other. In embodiments, the spacer 116 may be shaped to receive and hold the guard wire conductors 104a-104f in a fixed, spaced relation to each other about the periphery of the bundle. The spacer 116 may include a first plurality of rounded notches 118, 120, 122 having constricted openings formed in the outer periphery 124 of the spacer.

The rounded notches 118, 120, 122 may be shaped to receive and hold the three power feeder conductors 30, 32, 34 in a fixed, spaced relation to each other about the periphery 124 of the bundle. In an embodiment, the shielded power feeder conductor system 100 may include a plurality of spacers 116 positioned along the power feeder conductors 30, 32, 34 through at least the lightning threat zone 114. In an embodiment, the power feeder conductors 30, 32, 34 and guard wire conductors 104a-104f may extend through the lightning threat zone in a helical configuration.

In an embodiment, spacer 116 may include a second plurality of rounded notches 126, 128, 130, 132, 134, 136 having constricted openings formed in the outer periphery 124 of the spacer. The second plurality of rounded notches 126, 128, 130, 132, 134, 136 may be shaped to receive and hold the grounded guard wire conductors 104a-104f in a fixed, spaced relation to each other about the periphery of the bundle. In an embodiment, the first plurality of rounded notches 118, 120, 122 and the second plurality of rounded notches 126, 128, 130, 132, 134, 136 may be spaced evenly about the periphery 124 of the spacer 116 relative to each other. In an embodiment, the first plurality of rounded notches 118, 120, 122 and the second plurality of rounded notches 126, 128, 130, 132, 134, 136 may be spaced about 40° apart from each other about the periphery 124 of the spacer 116. Specifically, in an embodiment, each rounded notch of the first and second plurality of rounded notches 118, 120, 122, and 126, 128, 130, 132, 134, 136, respectively, may be about 40° from the adjacent rounded notch on either side of it.

In an embodiment, the shielded power feeder conductor 100 further may include a neutral conductor 50 positioned adjacent at least one of the power feeder conductors 30, 32, 34 in a center of the bundle 101. In an embodiment, the spacer 116 may include a central opening 138 shaped to enclose the neutral conductor 50. In an embodiment, the power feeder conductors 30, 32, 34 may be spaced from the neutral conductor 50 to provide for ventilation therebetween, and spaced evenly about the neutral conductor 50. The spacer 116 may include a split 140 extending from the outer periphery 124 to the central opening 138. The split 140 may have a curvilinear shape. In other embodiments, the split 140 may be linear or have other shapes.

In an embodiment, the spacer 116 may be made of a material sufficiently flexible to permit the spacer to be separated at the split 140 to allow insertion of the neutral conductor 50 into the central opening 138 of the spacer. In embodiments, the spacer 124 may be made of a material selected from a synthetic elastomer and a silicone-base synthetic rubber.

As shown best in FIGS. 10 and 11, the spacer 124 may include a circumferential groove 142 shaped to receive a lacing tape 144 for retaining the three unshielded power feeder conductors 30, 32, 34 and the grounded guard wire conductors 104a-104f against the spacer 116 and within the first plurality of rounded notches 118, 120, 122 and second plurality of notches 126, 128, 130, 132, 134, 136, respectively. In an embodiment, the spacer 124 may include a circumferential recess 146 shaped to receive a strap or plastic clamp (not shown) for securing the bundle 101 to an adjacent structure on the vehicle 19, such as a bulkhead.

In an embodiment, a method for forming the shielded power feeder conductor 100 may include positioning the plurality of unshielded power feeder conductors 30, 32, 34 in a spaced-apart relation, positioning a plurality of grounded guard wire conductors 104a-104f in a spaced-apart relation, and positioning the plurality of grounded guard wire conductors 104a-104f adjacent each of the plurality of unshielded power feeder conductors in a spaced-apart relation. In an embodiment, the method may include forming a bundle 101 of the plurality of power feeder conductors 30, 32, 34 and the plurality of grounded guard wire conductors 104a-104f by fixing the spacing between the plurality of power feeder conductors and the plurality of grounded guard wire conductors. The grounded guard wire conductors 104a-104f may be routed to follow the power feeder conductors in parallel and act to cancel an electromagnetic field generated during electromagnetic interference (EMI), such as a lightning strike to the vehicle 19. The grounded guard wire conductors 104a-104f may set up differential mode current paths that during a lightning event may generate opposite EM fields. The close proximity of the guard wires 104a-104f to the power conductors 30, 32, 34 allows such EM fields to cancel the field from the EMI.

The shielded power feeder system 100 shown in FIGS. 8, 9, 10, and 11 represents an advancement over prior shield systems because the arrangement of grounded guard wire conductors 104a-104f about the periphery 124 of the spacer 116 provides circumferential coverage of the power feeder conductors 30, 32, 34, and the neutral 50 in the manner of a Faraday cage. As shown in FIG. 9, the grounded guard wire conductors 104a-104f may be positioned slightly outside of the feeder conductors 30, 32, 24 in a radial direction. Protection of the power feeder conductors 30, 32, 34 may be enhanced by arranging the grounded guard wire conductors 104a-104f so that two different ones of the grounded guard wire conductors are positioned on either side of each of the power feeder conductors 30, 32, 34 in one-to-one correspondence.

Each of the grounded guard wire conductors 104a-104f may be spaced from its adjacent power feeder conductors 30, 32, 34 sufficiently to provide air circulation between the grounded guard wire conductors and the conductors to prevent heat buildup. Further, by placing the guard wire conductors 104a-104f adjacent the power feeder conductors 30, 32, 34 in a generally circumferential direction, the bundle 101 may have a smaller overall diameter, so that the bundle may fit through a smaller opening than prior art bundles in which the guard wire conductors may be outside the bundle, and yet have more grounded guard wires in bundle.

While the forms of apparatus and methods disclosed herein constitute preferred embodiments on the invention, it is to be understood that other forms may be employed without departing from the scope of the invention.

What is claimed is:

1. A power feeder system shielded for protection from electromagnetic interference, the system comprising:
a bundle, the bundle including
a plurality of unshielded power feeder conductors; and
a plurality of grounded guard wire conductors, each of the plurality of grounded guard wire conductors being grounded at both ends, ones of the plurality of the grounded guard wire conductors spaced individually about the bundle and positioned adjacent and on both sides of each one of the plurality of the unshielded power feeder conductors, wherein each one of the plurality of the unshielded power feeder conductors is adjacent two different ones of the plurality of grounded guard wire conductors, so that during electromagnetic interference, the plurality of grounded guard wire conductors set up differential mode current paths that generate opposite electromagnetic fields that cancel a field from the electromagnetic interference.

2. The shielded power feeder system of claim 1, wherein the plurality of grounded guard wire conductors spaced about the bundle are spaced about a periphery of the bundle.

3. The shielded power feeder system of claim 1, wherein the plurality of unshielded power feeder conductors includes three unshielded power feeder conductors, and ones of the plurality of grounded guard wire conductors are positioned on both sides of each of the three unshielded power feeder conductors.

4. The shielded power feeder conductor of claim 3, further comprising at least one spacer shaped to receive and hold the three power feeder conductors in a fixed, spaced relation to each other.

5. The shielded power feeder conductor of claim 4, wherein the spacer is shaped to receive and hold the grounded guard wire conductors in a fixed, spaced relation to each other about the periphery of the bundle.

6. The shielded power feeder conductor of claim 5, wherein the spacer includes a first plurality of rounded notches having constricted openings formed in an outer periphery, the first plurality of rounded notches shaped to receive and hold the three power feeder conductors in a fixed, spaced relation to each other about the periphery of the bundle.

7. The shielded power feeder conductor of claim 6, wherein the spacer includes a second plurality of rounded notches having constricted openings formed in the outer periphery, the second plurality of rounded notches shaped to receive and hold the ones of the grounded guard wire conductors in a fixed, spaced relation to each other about the periphery of the bundle.

8. The shielded power feeder conductor of claim 7, wherein the first plurality of rounded notches and the second plurality of rounded notches are spaced evenly about the periphery relative to each other.

9. The shielded power feeder conductor of claim 8, wherein the rounded notches of the first plurality of rounded notches and the rounded notches of the second plurality of rounded notches are spaced about 40° apart from each other about the periphery of the spacer.

10. The shielded power feeder conductor of claim 5, further comprising a shielded neutral conductor positioned adjacent at least one of the power feeder conductors at within the periphery of the bundle; and with the spacer including an opening shaped to enclose the neutral conductor.

11. The shielded power feeder conductor of claim 10, wherein the neutral conductor is positioned in a center of the bundle.

12. The shielded power feeder conductor of claim 11, wherein the spacer includes a central opening shaped to receive the neutral conductor.

13. The shielded power feeder conductor of claim 12, wherein the neutral conductor is spaced from the three unshielded power feeder conductors.

14. The shielded power feeder conductor of claim 13, wherein the three unshielded power feeder conductors are spaced evenly about the neutral conductor.

15. An aircraft, comprising:
a power feeder system shielded for protection from electromagnetic interference, the system forming a bundle, the bundle including
a plurality of unshielded power feeder conductors; and
a plurality of grounded guard wire conductors, each of the plurality of grounded guard wire conductors being grounded at both ends, ones of the plurality of grounded guard wire conductors positioned on both sides of each one of the plurality of unshielded power feeder conductors, wherein each one of the plurality of the unshielded power feeder conductors is adjacent two different ones of the plurality of grounded guard wire conductors, so that during the electromagnetic interference, the plurality of grounded guard wire conductors set up differential mode current paths that generate opposite electromagnetic fields that cancel a field from the electromagnetic interference.

16. The aircraft of claim 15, further comprising a spacer having a first plurality of rounded notches with restricted openings, the rounded notches of the first plurality of rounded notches shaped to receive and retain the plurality of power feeder conductors therein; and a second plurality of rounded notches with restricted openings, the rounded notches of the second plurality of rounded notches shaped to receive and retain the plurality of grounded guard wires therein; the notches of the first plurality of notches and the second plurality of notches spaced evenly about a periphery of the spacer.

17. A method for forming a power feeder system shielded for protection from electromagnetic interference, the shielded power feeder conductor forming a bundle, the method comprising:
positioning a plurality of unshielded power feeder conductors in a spaced-apart relation;
positioning a plurality of grounded guard wire conductors in a spaced-apart relation, and grounding each of the plurality of grounded guard wire conductors at both ends;
positioning ones of the plurality of grounded guard wire conductors adjacent each of the plurality of unshielded power feeder conductors in a spaced-apart relation about the periphery of the bundle and on both sides of each of the plurality of unshielded power feeder conductors, wherein each one of the plurality of the unshielded power feeder conductors is adjacent two different ones of the plurality of grounded guard wire conductors, so that during the electromagnetic interference, the plurality of grounded guard wire conductors set up differential mode current paths that generate opposite electromagnetic fields that cancel a field from the electromagnetic interference; and
forming the bundle of the plurality of power feeder conductors and the plurality of grounded guard wire conductors by fixing the spacing between the plurality of power feeder conductors and the plurality of grounded guard wire conductors.

18. The shielded power feeder system of claim 1, wherein each of the grounded guard wire conductors is spaced from its adjacent power feeder conductor.

19. The aircraft of claim 15, wherein each of the grounded guard wire conductors is spaced from its adjacent power feeder conductor.

* * * * *